March 8, 1949.   B. T. JOHNSTON   2,463,775
COMBINED DESK AND MIRROR DEVICE
FOR TRANSFERRING RECORDS
Filed Nov. 13, 1946
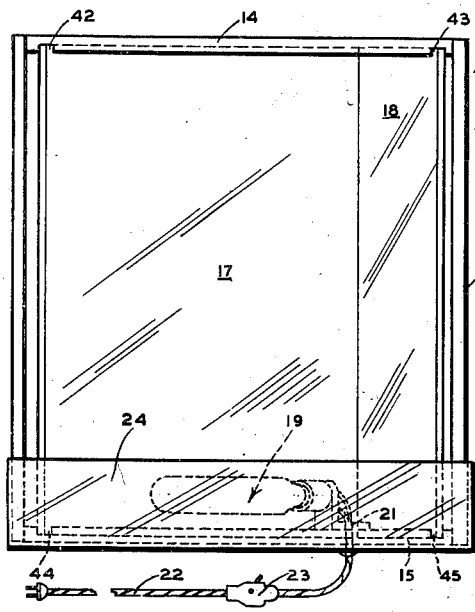
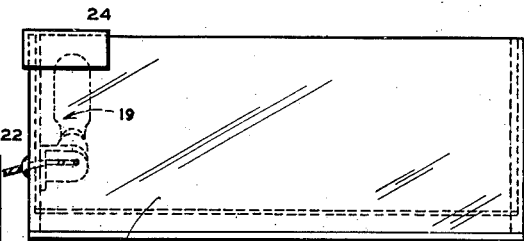
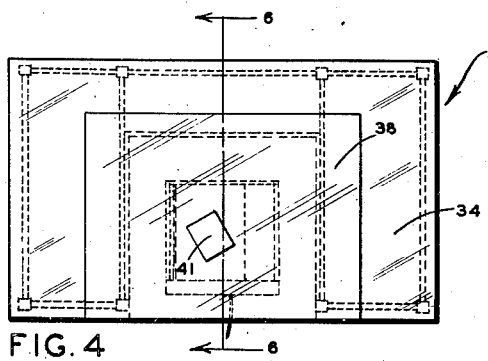
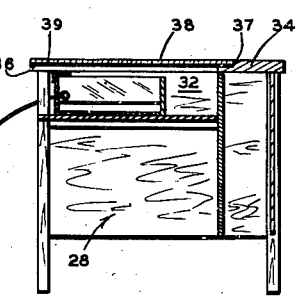
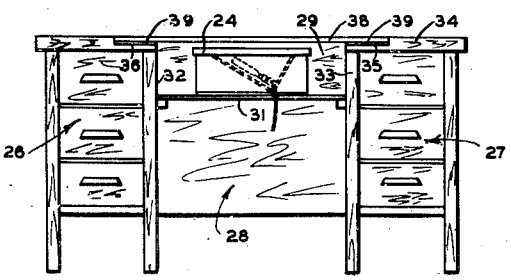
INVENTOR
BENJAMIN THOMAS JOHNSTON
BY
ATTORNEY Patented Mar. 8, 1949

2,463,775

UNITED STATES PATENT OFFICE 2,463,775

COMBINED DESK AND MIRROR DEVICE FOR TRANSFERRING RECORDS

Benjamin Thomas Johnston, St. Louis, Mo.

Application November 13, 1946, Serial No. 709,607

1 Claim. (Cl. 88—74)

This invention relates to record transfer devices generally and concerns itself more particularly with optical means for making intelligence recorded on one side of a sheet available to an observer whereby such intelligence may be recorded on the opposite side of the sheet without reverse movement thereof and while the same is in a flat position to receive the writing of said observer.

In numerous accounting operations, it is necessary to transcribe intelligence recorded on one side of a record sheet to the reverse side thereof. This is notably true in public utility accounting as pertains to meter reading records. Here, a meter sheet is made up for each meter in the field, and these sheets are arranged in books which the meter reader takes with him to record his readings at each customer's location. These sheets are printed in blank and have spaces provided on one side thereof for the recordation of periodic meter readings over a period of time, for example one year. Additionally, and on this same side of the sheet, are provided blank spaces in which are recorded the customer's name, the location of the meter, its type, serial number, etc. The reverse side of the sheet is identical and provides for the recordation of meter readings for a second period of time, identical with the first.

Under present accounting practices, all meter books are brought into a central billing department where bills, based upon the meter readings, are rendered. When the sheets of a book are "filled," that is, when one side of the sheets therein have been used for a full record period, the book is given to a clerk who removes each sheet and transfers to the reverse side thereof the meter history items, such as the customer's name, location, etc., preparatory to conditioning the book for its second meter reading period. Since the information transferred is somewhat extensive, it is required of the clerk that he turn each sheet back and forth several times during the transferring operation. Here, the human error becomes a factor and mistakes result. Also, since the records are permanent, they are made in ink, and time is consumed to allow the ink to dry, blots result, etc.

To overcome such difficulties in this, and kindred accounting practices, is the purpose of the instant invention and it has for a general object the provision of a record transfer device capable of making intelligence recorded on one side of a sheet visible to an observer to the end that such intelligence may be recorded on the opposite, or reverse, side of the sheet without reverse movement thereof and while the same is maintained in a flat position to receive writing on its reverse side.

More specifically, it is an object of the invention to provide a transfer unit of the type described which is economical to construct, is adaptable to any type of desk, and requires no special training for its use.

Other objects and advantages will become apparent as the description proceeds and a more comprehensive understanding of the invention will be afforded from the following detailed specification when considered in conjunction with the accompanying drawing, in which Figs. 1, 2 and 3 are plan, front and side views, respectively, of a record transfer unit involving the instant invention, and Figs. 4, 5 and 6 are plan, front and cross sectional views of a typical desk assembly in which a unit such as is illustrated in Fig. 1 may be installed, Fig. 6 being taken along the line 6—6 of Fig. 4.

As illustrated in Fig. 1, a preferred embodiment of the invention comprises a rectangularly shaped enclosure, generally designated by the reference numeral 11, which includes two side members 12 and 13, two end members 14 and 15, and a bottom member 16. Within the enclosure 11 is contained an optical unit comprising a first mirror 17 and a second mirror 18 which are arranged with each other substantially at a right angle. Also contained within the enclosure is an illuminating element 19 taking the form of an electric lamp to which current is supplied by a plug-in cord 22 through a switch 23 located externally of the enclosure 11. A glare shield 24 is provided to prevent direct rays of the lamp 19 from reaching the eyes of an operator, who with the illustrated embodiment, will sit to the front of the unit as is shown in Fig. 1. This glare shield 24 may take any form and may be fabricated from any suitable material and, as is illustrated, rests on top of the side walls 12 and 13 and the end wall 15 of the enclosure 11.

While the instant invention is adaptable to and may be used within, or without, any type of supporting structure, a typical desk assembly will be illustrated and described. In Figs. 4 to 6, a conventional office desk is illustrated which has been modified to accommodate the record transfer unit afore described. This desk takes the form of a flat top desk 25 which is provided with desk drawer assemblies 26 and 27 disposed oppositely on either side of a knee hole space 28. A compartment 29 is provided above the knee hole space 28 to receive the transfer unit illustrated in Figs. 1 to 3. This compartment is bounded by a base 31 upon which the transfer unit is slidably mounted and two sides 32 and 33 formed by portions of the desk drawer assemblies 26 and 27. A top 34 for the desk is recessed at 35, 36 and 37 to receive a transparent panel 38 which rests in the recessed portions of the top to fit flush with the upper surface thereof. The panel 38 which may take the form of a piece of clear plate glass rests on a felt strip 39 covering the bottom of the recessed portions 35, 36 and 37 of the desk top.

With regard to the adaptation of the transfer unit illustrated in Figs. 1 to 3 to the desk illustrated in Figs. 4 to 6, it is to be noted that no particular teaching, which would amount to a limitation of the invention, is intended. In other words the enclosure 11 may carry its own transparent panel to complete the enclosure, thus making the unit portable and self-contained, or it may be adapted to any type of supporting structure.

In operation, and considering the unit to be installed in a desk such as that illustrated and described, a record sheet 41 is placed on the transparent panel 38 to occupy a position above the mirror 17, and the lamp 19, which is coated on one side with a reflecting material, is arranged to direct its rays outwardly and downwardly against the mirror 17 for reflection to the underside of the transparent panel 38. The reflected light being diminished in intensity prevents the "bleeding" of written intelligence through the paper. In this manner the underside of the record sheet 41 is sufficiently illuminated and its image is cast in the mirror 17 from which point it is reflected to the mirror 18 located to the right of the observer. Here the image of the reverse side of the record sheet 41 is visible to an observer whereby the intelligence recorded on the reverse side of the record sheet 41 is available in uninverted form. Thus it is possible for an observer to record this intelligence on the top side of the record sheet 41 without reverse movement thereof and while the same is in flat position suitable to receive the writing of the observer.

Although illustrated and described as a transfer record unit suitable for the use of a right handed observer, it is not intended to limit the arrangement of the mirrors 17 and 18 to any specific position within the enclosure. For a left handed observer, it may be advisable to rearrange the mirror 18 to occupy a position to the left of the mirror 17, or as dictated by other requirements, it might be advisable to place the same at the top of the mirror 17 as viewed in Fig. 1, or going further to place it at the bottom and arrange the illuminating element 19 at the top of the enclosure. Any one of these positions of these elements or modifications thereof are intended to be within the teachings of the invention.

With further regard to the arrangement of the record transfer unit, it is to be noted that the same is so dimensioned as to be positioned at any angle in the compartment 29. This makes it particularly useful in transferring intelligence recorded on "tumble-head" forms, which are well known in the art. Here, and by taking the meter reading sheet above referred to as an example, the meter history items would be recorded at the top of one side of a sheet for the first record period and at what would be the bottom of this side of the sheet, on the reverse side thereof, for the second record period. The spaces provided on the reverse side of the sheet for the meter history items for the second period are inverted so that the sheet may be turned from the bottom away from the operator to make them available at the top of the reverse side of the sheet for the second record period.

As will be apparent to those skilled in the art, and for use with such a form, the record transfer unit may be positioned so that the mirror 18 is in front of, and away from, the observer. Thus, with reference to Fig. 1, the unit would be rotated counterclockwise through 90°, and the sheet 41 would be positioned above the mirror 17 so that the lines of writing thereon would be parallel to the longest dimension of the mirror 18. Then the inverted intelligence on the underside of the sheet would appear uninverted in the mirror 18 so that it could be copied at the top of the sheet on the upper side thereof.

Other and varied arrangements of the unit may be resorted to in practice, but an additional feature of the invention to be noted resides in its adaptation to modern loose leaf accounting forms as differentiated from the old bound volume practice.

The mirrors 17 and 18, which rest within suitable recesses 42, 43, 44 and 45 in the end members 14 and 15, are arranged substantially at right angles with each other and the mirror 17 is positioned to occupy an angle approximating 30° with the horizontal. Within limits, these angles may be varied to meet certain requirements, but it is specifically taught that the mirror 17 shall be substantially larger in surface area than the mirror 18.

While a particular embodiment of the invention has been illustrated and described, it is of course susceptible to modifications and changes, and insofar as such fall within the scope of the appended claim, they are considered to be covered as if described.

What is claimed is:

In a record transfer unit, a desk having a transparent panel supported in the top thereof, a compartment formed in said desk beneath said panel constituting a support, a frame on said support below said panel, a first mirror in said frame at an acute angle with said panel adapted to receive an image of a record sheet placed on said panel, a second mirror supported in said frame abutting said first mirror at substantially a right angle therewith to receive an image from the first mirror and direct it outwardly through the panel, and means in the frame to illuminate the panel and the record sheet supported thereby.

BENJAMIN THOMAS JOHNSTON.

REFERENCES CITED

The following references are of record in the file of this patent:

UNITED STATES PATENTS

| Number | Name | Date |
|---|---|---|
| 633,481 | Paschall | Sept. 19, 1899 |
| 919,245 | Roberts | Apr. 20, 1909 |
| 958,762 | Peckham | May 24, 1910 |
| 1,221,643 | Wood | Apr. 3, 1917 |
| 1,334,810 | Smith | Mar. 23, 1920 |
| 1,643,626 | May | Sept. 27, 1927 |